Figure 1:
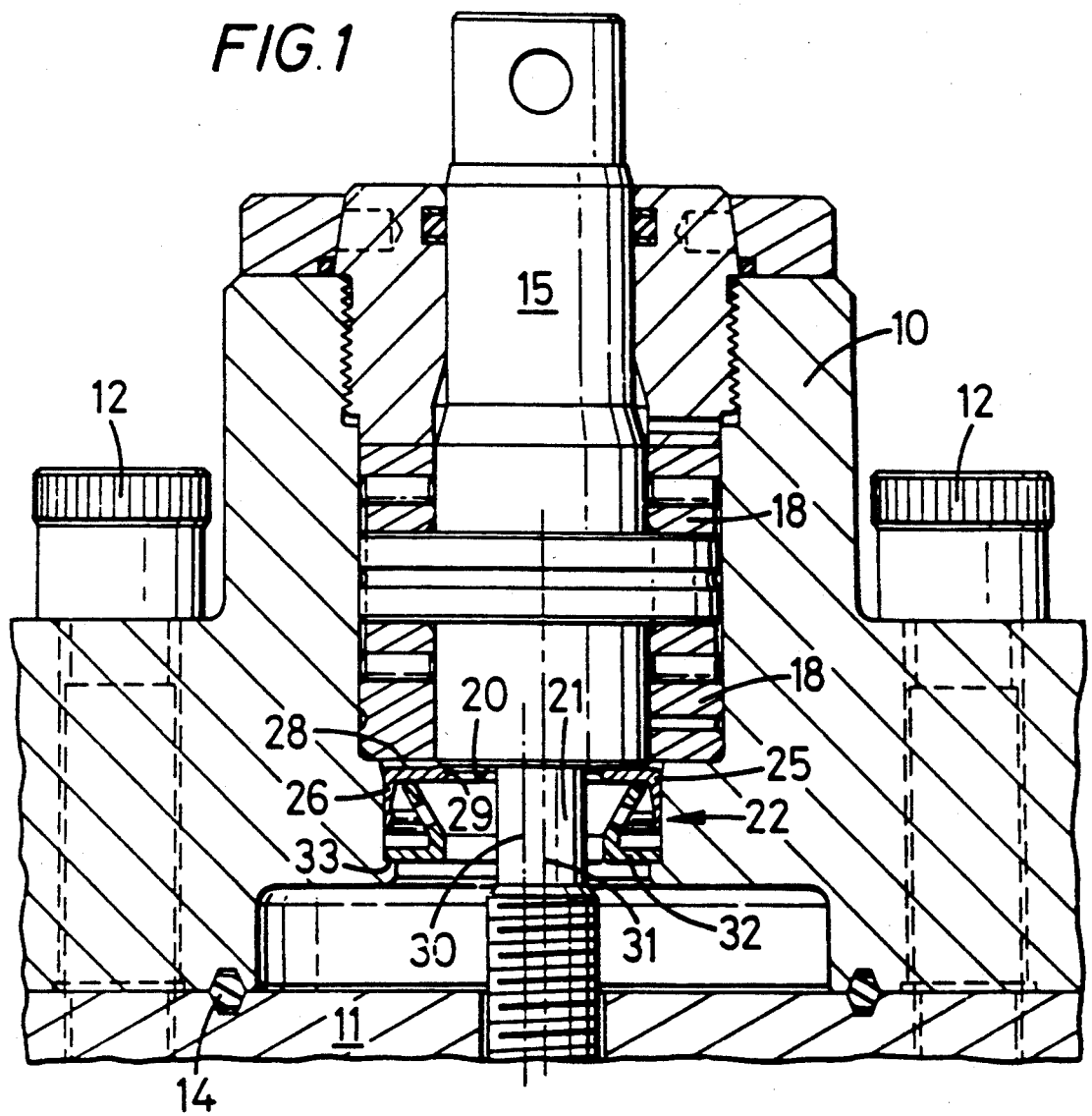

United States Patent

Thornburrow

[11] Patent Number: 5,209,256
[45] Date of Patent: May 11, 1993

[54] SEALING ARRANGEMENTS

[75] Inventor: Edward T. Thornburrow, Leeds, United Kingdom

[73] Assignee: Cooper Industries, Inc., Houston, Tex.

[21] Appl. No.: 864,283

[22] Filed: Apr. 6, 1992

[30] Foreign Application Priority Data

Apr. 9, 1991 [EP] European Pat. Off. ........ 91303097.9

[51] Int. Cl.⁵ .......................................... F16K 41/00
[52] U.S. Cl. .................................. 137/214; 277/152
[58] Field of Search ............... 251/214; 277/236, 152, 277/153

[56] References Cited

U.S. PATENT DOCUMENTS

| 4,854,600 | 8/1989 | Halling et al. | 277/236 |
| 5,050,843 | 9/1991 | Brooks | 277/236 X |
| 5,078,412 | 1/1992 | Baumgarth | 277/236 X |

Primary Examiner—Martin P. Schwadron
Assistant Examiner—Kevin Lee
Attorney, Agent, or Firm—Jackie L. Duke; William B. Patterson; Alan R. Thiele

[57] ABSTRACT

A sealing arrangement in which a sealing member 25 seals against an annular sealing surface 20. The sealing member 25 has an annular sealing surface 29 the axis of which is offset relative to the rotational axis of the surface 20. Thus when the annular surface 20 rotates the area swept out by the sealing member surface is larger than the area of its sealing surface. The arrangement has application to seals for gate valve stems.

4 Claims, 1 Drawing Sheet

SEALING ARRANGEMENTS

This invention relates to sealing arrangements in which an annular seal seals against an annular face. The invention has particular application to sealing around the stem of a gate valve, although its use is by no means limited to such application.

Gate valves make use of a gate which can be raised or lowered to open or close the valve. The gate is connected to an actuating mechanism which includes a stem for causing movement of the gate to open and close the valve. It is usual to provide a sealing arrangement around the stem of a gate valve and particularly in subsea applications metal-to-metal sealing assemblies are used for such stems.

In one form of gate valve which is a fail safe valve the stem moves axially in order to actuate the valve. This type of arrangement is known as a rising stem and the stem is so arranged that it slides through the internal bore of a metal seal. This type of sealing arrangement has proved quite successful because the seal lip has a large contact area with the stem as one moves axially relative to the other. The mode of sliding contact also allows the re-establishment of a fluid film at every stroke and this tends to act as a lubricant.

Manually operated gate valves conventionally have what are known as non-rising stems. In this arrangement the lower end of the stem has a thread which engages a corresponding thread in the gate. Movement of the gate is caused by rotation of the stem, but the stem itself does not move axially. The sealing arrangement for such a valve usually comprises an annular seal which engages an annular face on the stem. It has been found that such a sealing arrangement with metal-to-metal sealing is prone to failure since the same narrow band of stem continuously rides around inside the stem seal internal bore resulting in rapid wear and galling. As a consequence when metal stem sealing on manual valves has been required the valve has sometimes been provided with a rising stem so that the metal seal can work in the same manner as outlined above for the fail safe valve. This however has penalties both in cost and size.

The present invention is directed towards an improved sealing arrangement which can operate satisfactorily in a gate valve of the non-rising stem type.

According to one aspect of the present invention there is provided a sealing arrangement for sealing against an annular face comprising a sealing member having an annular sealing surface which sealingly engages said annular face, said sealing member being located such that the axis of the annular sealing surface is offset relative to the rotational axis of the annular face, whereby when the annular face rotates the area swept out by the sealing member is larger than the area of its sealing surface. The sealing member may be a metal sealing member.

Another aspect of the present invention provides a gate valve which includes a sealing arrangement according to the one aspect, the annular face being formed on the stem of the gate valve and the sealing member being disposed around said stem with its axis offset relative to the stem axis. The gate valve may include a seal loading ring which acts to maintain the sealing surface of the sealing member in contact with the annular face on said stem.

Figure 2:
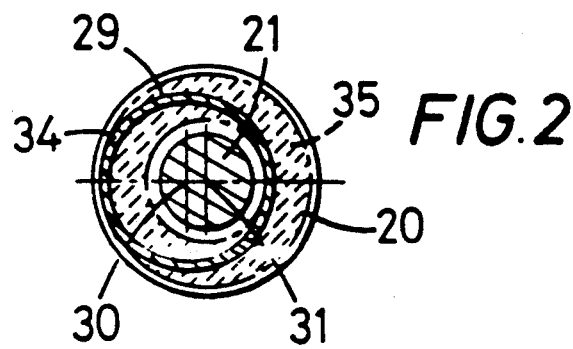

The invention will be described now by way of example only, with particular reference to the accompanying drawings. In the drawings:

FIG. 1 is a schematic sectional view illustrating a gate valve incorporating a sealing arrangement in accordance with the present invention, and FIG. 2 illustrates the way in which the sealing arrangement operates.

FIG. 1 is a schematic illustration of part of a gate valve which incorporates a sealing arrangement constructed in accordance with the present invention. The details are approximate only and are intended simply to illustrate the way in which the sealing arrangement can operate. Elements not essential for an understanding of the invention are not included and it will be apparent to those skilled in the art how the elements shown connect with the remainder of a gate valve.

In the drawing there is shown a bonnet 10 of a gate valve which is mounted upon a valve body 11. The bonnet is secured to the valve body by means of bolts 12. An annular seal 14 is provided at the junction of the bonnet and valve body.

The bonnet has a central opening through which extends a valve stem 15. The upper part of the stem has a relatively large diameter which extends through thrust bearings which are shown generally at 18. Below the thrust bearings the diameter of the stem reduces to define an annular sealing face shown at 20. The lower part of the stem shown at 21 extends downwardly through a sealing arrangement shown at 22 and into the valve body 11. It will be appreciated by those skilled in the art that the lower part of the stem (not shown) includes a thread which threadably engages the gate of the gate valve. Thus, when the stem 15 is rotated the gate of the gate valve is either raised or lowered depending upon the sense of rotation of the stem.

The sealing arrangement 22 comprises an annular metal seal 25 which has an axially extending part 26 in contact with the wall of the bonnet bore, an inwardly directed part 28 which is formed integrally with the part 26 and which terminates in an upwardly directed lip 29. The upper surface of the lip 29 defines an annular sealing surface in contact with the face 20 formed on the stem of the valve. It will be seen that the axis 30 of the annular lip 29 is offset relative to the axis 31 of the stem of the valve.

The lip 29 on the metal sealing member 25 is urged into contact with the annular face 20 by means of a seal loading ring 32 which sits upon an annular step 33 formed in the wall of the bore through the bonnet.

Further sealing effect is obtained by virtue of the pressure of the fluid being sealed against urging the lip 29 onto the stem sealing face.

As has been explained previously in order to open and close the gate of the gate valve the stem is rotated in an appropriate sense. When the stem is so rotated the area swept out by the sealing face of the lip 29 against the annular face 20 is relatively large in view of the offset between the axis of the annular lip 29 and the axis of the stem of the valve. This principle is illustrated in FIG. 2 of the drawings where the sealing surface of the lip is shown at 34 whilst the area swept out by the seal on the face 20 is shown at 35. The main advantage of this arrangement is that it reduces significantly the degree of wear which occurs between the annular face 20 and the sealing lip 29. This arises principally because of the relatively large area which the sealing surface sweeps out against the face 20.

I claim:

1. A sealing arrangement for sealing against an annular face comprising a sealing member having an annular sealing surface which sealingly engages said annular face, said sealing member being located such that the axis of the annular sealing surface is offset relative to the rotational axis of the annular face, whereby when the annular face rotates the area swept out by the sealing member is larger than the area of it sealing surface.

2. A sealing arrangement according to claim 1, wherein the sealing member is a metal sealing member.

3. A sealing arrangement according to claim 2 for use in a gate valve, wherein the annular face is formed on the stem of the gate valve and the sealing member being disposed around said stem with its axis offset relative to the stem axis.

4. A gate valve according to claim 3, including a loading ring which acts to urge the sealing surface of the sealing member into contact with the annular face on said stem.

* * * * *